A. S. SMITH.
SELF-RAKES FOR REAPERS.

No. 173,566. Patented Feb. 15, 1876.

WITNESSES:
E. Wolff
Alex F. Roberts

INVENTOR:
A. S. Smith
BY
Munn & Co.
ATTORNEYS.

UNITED STATES PATENT OFFICE.

ABNER S. SMITH, OF HANNIBAL, MISSOURI.

IMPROVEMENT IN SELF-RAKES FOR REAPERS.

Specification forming part of Letters Patent No. 173,566, dated February 15, 1876; application filed November 13, 1875.

*To all whom it may concern:*

Figure 1:
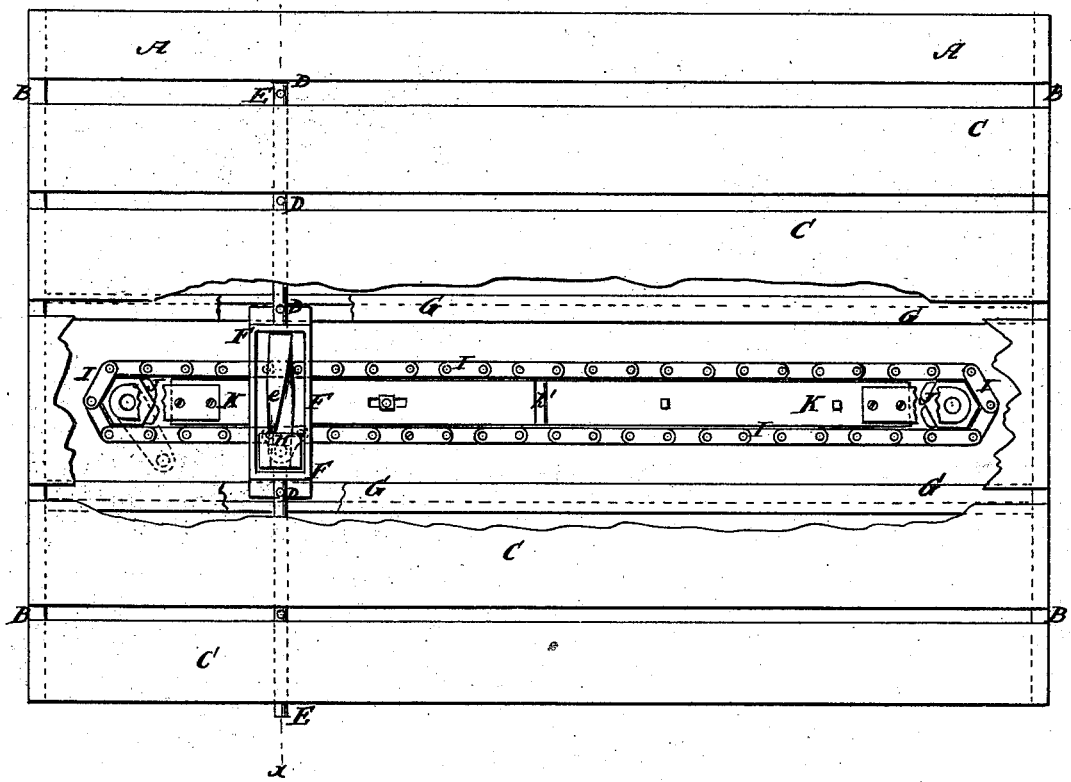
Figure 2:
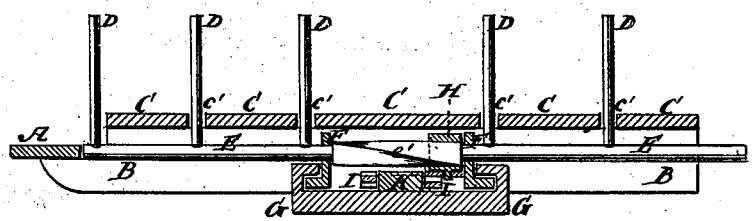

Be it known that I, ABNER S. SMITH, of Hannibal, in the county of Marion and State of Missouri, have invented a new and useful Improvement in Self-Rake for Reapers, of which the following is a specification:

Figure 1 is a top view of a reaper-platform to which my improved rake has been applied, part being broken away to show the construction. Fig. 2 is a vertical cross-section of the same, taken through the line $x\ x$, Fig. 1.

Similar letters of reference indicate corresponding parts.

The object of this invention is to furnish an improved rake for attachment to harvesters and reapers to remove the cut grain from the platform, and deposit it in gavels upon the ground, and which shall be simple in construction and effective in operation, being operated by the advance of the machine.

The invention will first be described in connection with drawing, and then pointed out in the claim.

A represents the cutter-bar, B the platform-frame, and C the platform, of a reaper. The platform C is formed by attaching narrow strips to the frame B at a little distance from each other, so as to form narrow parallel slots $c'$, extending from end to end of said platform, for the passage of the rake-teeth D, which are attached to a bar or head, E, placed beneath the platform C, and passing through and working in the ends of a small frame, F. The ends of the frame F extend downward, and have outwardly-projecting flanges formed upon them, which enter longitudinal grooves in the sides of a box, G, attached to the frame B, and extending the entire length of the platform. H is a block or pin fitting into the frame F, and attached to an endless chain, I, which passes around two chain-pulleys, J. The pulleys J are pivoted to the ends of a bar, K, which is bolted to the bottom of the box G. The bar K is made in two part, and the bolt-holes in one or both of said parts are elongated, so that by loosening the said bolts and inserting a wider or narrower block, $k'$, between the adjacent ends of the said parts, the chain I may be tightened or slackened, as may be desired. The part of the rake-head E that passes through the block H within the frame F has a twist, $e'$, of one-quarter of a turn formed in it, so that as the block H moves from one end to the other of the frame F, in passing around the pulleys J, the rake-head E may be turned through one-quarter of a revolution, to raise the rake-teeth D through the slots $c'$ into a vertical position at one end of the platform C, to cause them to sweep the cut grain from said platform, and to turn them down into a horizontal position at the other end, to pass back beneath the platform without interfering with the falling grain. The inner pulley J is designed to be connected with and driven from the driving mechanism of the reaper by suitable gearing.

Having thus described my invention, I claim as new and desire to secure by Letters Patent—

The combination of rake-head having spiral $e'$, the block H, embracing said head and attached to an endless chain, the frame F, and box G, said frame being provided with projecting flanges that work in grooves of box, as and for the purpose specified.

ABNER S. SMITH.

Witnesses:
CHAS. J. VARBOUGH,
EDWD. B. EASTON.